(No Model.)
W. L. DAVIS.
MOTOR FOR PROPELLING CARS.
No. 472,524. Patented Apr. 12, 1892.
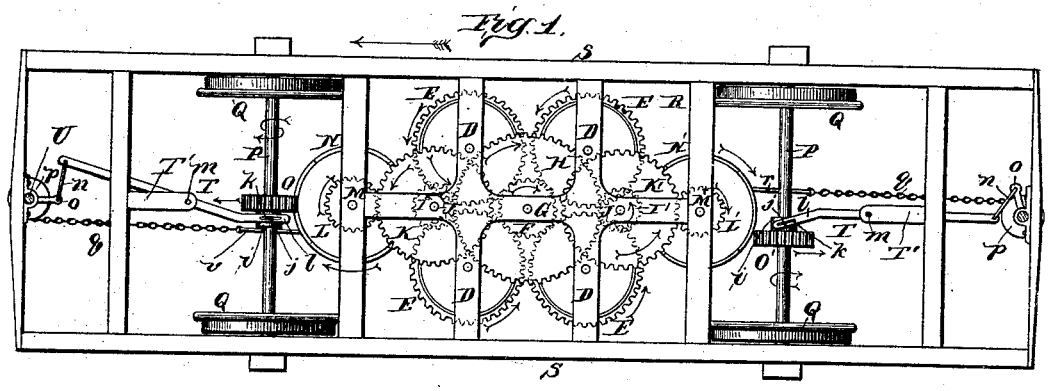
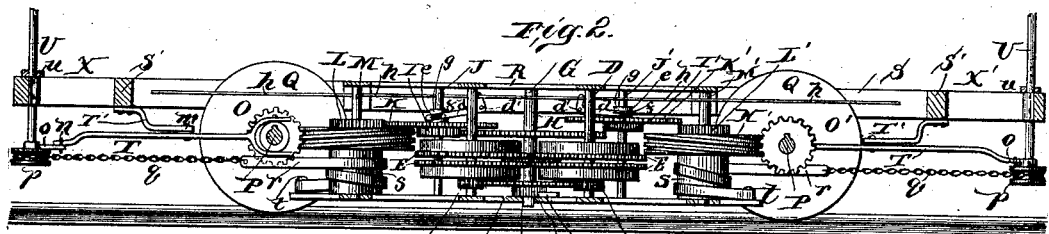
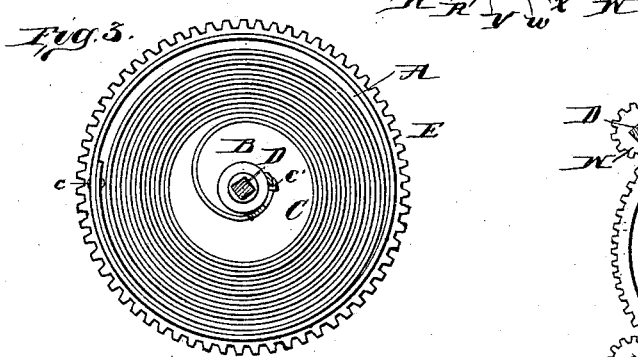
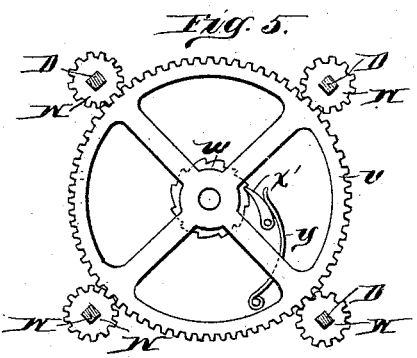
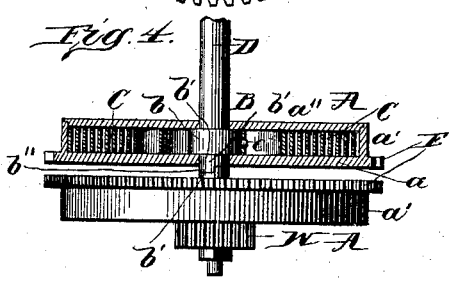
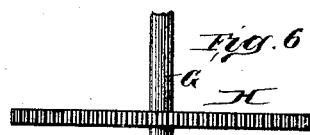
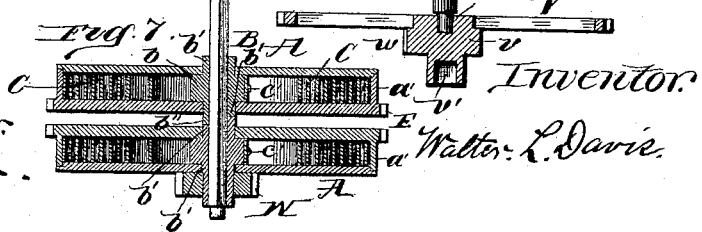
Witnesses.
Wm. M. Rheem
O. W. Bond
Inventor.
Walter L. Davis

UNITED STATES PATENT OFFICE.

WALTER L. DAVIS, OF CHICAGO, ILLINOIS.

MOTOR FOR PROPELLING CARS.

SPECIFICATION forming part of Letters Patent No. 472,524, dated April 12, 1892.

Application filed May 16, 1891. Serial No. 393,044. (No model.)

*To all whom it may concern:*

Be it known that I, WALTER L. DAVIS, a citizen of the United States, residing at Chicago, in the county of Cook and State of Illinois, have invented certain new and useful Improvements in Motors for Propelling Cars; and I do hereby declare that the following is a full, clear, and exact description of the invention, which will enable others skilled in the art to which it pertains to make and use the same, reference being had to the accompanying drawings, forming a part hereof, in which—

Figure 1 is a top or plan view showing the frame-work and wheels of a car with the propelling mechanism applied thereto. Fig. 2 is a side elevation showing the frame-work of the car in section. Fig. 3 is a face view of one of the barrels with its power-spring. Fig. 4 is an edge view showing one of the barrels in section and the other in elevation. Fig. 5 is a face view showing the winding mechanism for the power-springs. Fig. 6 is an elevation with the winding-wheel in section. Fig. 7 is a detail showing the manner of inserting and connecting the arbors for the spring.

The object of this invention is to construct a motor especially adapted for use in propelling street-cars, but which can be applied to and used for propelling cars or vehicles, and which will have the requisite power to produce the propulsion and have such power retained and utilized as required for actual use; and the nature of the invention consists in concentrating the power of a number of springs onto a single driving-wheel and transmitting the power thus concentrated to the axle for rotating the axle and propelling the car; in providing a power-transmitting mechanism between the main drive-wheel and the axle, which mechanism can be thrown into and out of use without impairing the operation of the power-producing mechanism; in providing means for holding the power-transmitting mechanism and releasing the connecting-gear for the axle at one and the same time and in releasing the power-transmitting mechanism and engaging the driving-gear for the axle therewith at the same time; in providing means for engaging and disengaging the power-transmitting mechanism with the power-imparting mechanism, and in the several parts and combinations of parts hereinafter described, and pointed out in the claims as new.

In the drawings, A represents a barrel, formed, as shown, of a back plate $a$ with an annular wall or rim $a'$ and a face-plate $a''$ entering the wall or rim $a'$, so as to form a barrel with a chamber for the reception of the power-spring, and, as shown, eight barrels A are used; but the number of barrels can be four or more than eight, as required for the power desired.

B is an arbor for each barrel A, and each arbor is formed of a center portion $b$ for the attachment of the inner end of the power-spring and with end journals $b'$, on which the plates $a$ and $a''$ are mounted, so that the barrel A is free to turn or revolve on the journals $b$ from the power of the spring.

C is a power-spring, one for each barrel A, and each spring is secured at its outer end by a pin $c$ or otherwise to the wall or rim $a'$, and each spring is secured at its inner end to the center $b$ of the barrel B by a suitable pin $c'$ or otherwise, so that the spring will lie in the barrel A between the arbor B and the wall $a'$.

D is a squared shaft carrying the arbor B, each shaft, as shown, carrying two arbors B and two barrels A, and the arbors are inserted in two adjoining barrels on the same shaft D by inserting each arbor from the face-plate side of the barrel, with the face-plate removed, to have the portion $b$ of each arbor in the chamber of the barrel, and then inserting the squared shaft D through a squared hole in each arbor B, so as to lock each arbor to the shaft, and, as shown, the abutting ends $b'$ of the two arbors are connected together by a clutch connection $b''$.

The shaft D, as shown in Fig. 7, extends from the end of the arbor B upward; but, as shown in Figs. 2 and 4, the arbor end is carried upward and incloses the shaft; but with either form of construction the arbors B have a firm connection to the shaft and one to the other, so that both arbors will turn simultaneously with the winding up of their power-springs.

The arrangement shown for mounting the barrels has two barrels on each shaft D, the two barrels on the same shaft being in close proximity one to the other, so as to bring the gear of the barrels side by side and close together, thereby enabling the gears of the several barrels to occupy parallel planes in close proximity one to the other.

E is a gear on the periphery of each barrel A, which gears for the two barrels on the same shaft D lie close together, as shown in Fig. 2, and these gears are formed with or firmly secured to each barrel, so as to travel with its barrel from the power of the spring.

F is a center pinion, with which all of the gears E mesh, so as to have the power of each spring C transmitted to and concentrated on this center pinion F.

G is a shaft, on which is firmly mounted or secured the pinion F, so that the revolving of the pinion F will revolve the shaft G.

H is the main drive-wheel firmly mounted or secured on the shaft G, so as to revolve with such shaft.

I is a pinion gearing with the main drive-wheel H, and I' is another pinion likewise gearing with the main drive-wheel H.

J is a shaft on which the pinion I is mounted, so as to slide longitudinally of the shaft and be locked with the shaft, so as to revolve therewith, the sliding of the pinion I on the shaft J being for the purpose of throwing the pinion into and out of mesh with the main drive-wheel H, and J' is a shaft, on which is mounted the pinion I' for the pinion to slide longitudinally of the shaft and be locked thereto, so as to revolve the shaft, and the sliding of the pinion I' on the shaft J' is for the purpose of throwing the pinion into and out of mesh with the main drive-wheel H.

K is a gear-wheel on the shaft J, which wheel is formed with or firmly secured to the pinion I and slides longitudinally on the shaft J and is locked to such shaft, so as to revolve therewith, and K' is a gear-wheel on the shaft J', formed with or secured to the pinion I' and sliding longitudinally on the shaft J' and locked to such shaft, so as to revolve therewith.

L is a pinion meshing with the gear-wheel K, and L' is a pinion meshing with the gear-wheel K'. The gear K meshes with the pinion L when the pinion I is in mesh with the main drive-wheel H, and the gear K is out of mesh with the pinion L when the pinion I is out of mesh with the main drive-wheel H, and the gear K' meshes with the pinion L' when the pinion I' is in mesh with the main drive-wheel H, and the gear K' is out of mesh with the pinion L' when the pinion I' is out of mesh with the main drive-wheel H. The pinion I and gear K are thrown out of mesh with the main drive-wheel H and the pinion L by means of an L-lever $d$, pivoted to a support by a pin or pivot $d'$ and having in its long arm a slot $e$, which receives a pin $f$, projecting from the hub $g$ of the gear K, and the short arm of which has attached thereto a rod $h$, so that by moving the rod $h$ the long arm of the lever $d$ will be thrown up, raising the gear K and pinion I by the engagement of the slot $e$ with the pin $f$, and the pinion I' and gear K' are thrown out of mesh with the main drive-wheel H and pinion L' by an L-lever $d$, having a slot $e$ in its long arm engaging a pin $f$, projecting from the hub $g$ of the gear K' and having a rod $h$ running from the short arm of the L-lever in the same manner as the corresponding parts for raising the gear K and pinion I and operating in the same way.

M is a shaft on which is firmly mounted or secured the pinion L, and M' is a shaft on which is firmly mounted or secured the pinion L'.

N is a worm-gear firmly mounted or secured on the shaft L, and N' is a worm-gear firmly mounted or secured on the shaft M'. The pitch of the worm-gears N and N' are opposite—that is, one of the gears has a right-hand pitch for its thread and the other has a left-hand pitch for its thread.

O is a gear meshing with the thread of the worm-gear N, and O' is a gear meshing with the thread of the worm-gear N'.

P is an axle, two axles being shown, one at each end of the car, and on one axle is movably mounted or secured the gear O, while the other axle has movably mounted or secured thereon the gear O'.

Q are the wheels for the axles P, attached to the axles in any usual and well-known manner.

R is an upper frame-work, and R' a lower frame-work for supporting the power mechanism, and each frame-work is formed of end bars, intermediate bars, and a central longitudinal bar, as shown in Figs. 1 and 2, and, as shown, the shafts D are supported at the upper end in the intermediate cross-bars of the frame-work R, the shafts M and M' are supported in the end cross-bars, and the shafts J and J' are supported in the longitudinal center bar, and these shafts at the lower end are supported in the corresponding bars for the frame-work R'.

S are side pieces of the frame of the car, to which is secured the upper frame-work R, and S' are two of the cross-pieces of the car-frame.

T is a lever, one at each end of the car, and each lever is pivotally connected with a support T', secured to the cross-piece S' at the end of the car by a suitable pin or pivot $m$, and each lever T at its inner end has a fork $l$, each arm of which has a slot $k$ to receive a pin $j$, projecting from the hub or center $i$ of the gear O or the gear O', so that by moving the lever T for the gear-wheel O or O' such wheel will be thrown out of mesh with its worm-gear N or its worm-gear N'.

U is a shaft at each end of the car, having at the upper end a suitable hand-wheel or handle (not shown) by which the shaft can be turned, and each shaft U has firmly secured thereto an arm $o$, which is connected by a link $n$ with the outer end of the lever T, so that by turning the shaft U the arm o will through the link n move the outer end of the lever T for the inner end of such lever to throw the gear-wheel connected therewith into or out of mesh with its worm-gear. The shaft U at its lower end has firmly secured thereto a grooved wheel p, to which is attached one end of a chain q for winding the chain q on the wheel p, and the inner end of the chain q is attached to the end of a flat spring r, which spring winds around a drum s and has its end attached to a pin t or other connection on the lower frame-work R', and a drum s is formed with or suitably secured to the worm-gear N and to the worm-gear N', and a brake-spring r, winding-chain q, and winding-wheel p are provided for each drum s.

V is a gear-wheel having a hub or center v with a journal, in which is a key-hole v', and the hub or center v on its periphery has ratchet-teeth w engaged by a ratchet x, which ratchet is held in engagement by a spring y. This gear-wheel V meshes with four pinions W, one pinion for each shaft D, and each pinion is firmly secured to its shaft, so that by turning the wheel V the pinions W will be turned, turning the shafts D and revolving the arbors B to wind up the several power-springs C. The wheel V is located in such relation with the main drive-wheel H as to have its hub v in a central line with the shaft G of the main drive-wheel H, and the lower end of the shaft G is stepped or mounted in the center or hub v, as shown in Fig. 6, so that the shaft G is free to revolve without revolving the gear-wheel V, and the gear-wheel V can be turned without turning the shaft G, the result being that the springs can be wound up without affecting the main drive-wheel and the main drive-wheel can revolve without affecting the winding mechanism.

The arbor B is slipped into its barrel A with the face-plate a'' removed, and the spring C is attached by the pin c to the wall a' and by the pin c' to the center b of its barrel, and when inserted the journal ends b' of each barrel will project, one through the plate a and one through the plate a'', mounting the barrel on the journal ends, and when two or more barrels are mounted on the same shaft D the abutting journal ends b' of each arbor B has a clutch b'' for engaging and locking one end with the other, so as to lock the two companion arbors B together, and the shaft D, when the clutch b'' is engaged, is passed through both arbors, locking the arbors to the shaft D and bringing the gears E adjacent one to the other, as shown in Fig. 4, and the lower journal of the lower arbor B has a squared center or hub to receive the winding-pinion W, and below this squared hub the end of the shaft D is rounded to form a journal for the lower end of the shaft. The barrels mounted on the shafts D are set side by side, as shown in Fig. 4, around the winding-wheel V for the winding-pinions W to engage such wheel, as shown in Fig. 5, and the hub or center v has its journal mounted in the longitudinal bar of the lower frame-work R', and the journal for the lower end of each shaft D is inserted in holes therefor in the cross-bars of the lower frame-work R', arranging the barrels around the center of the wheel V and equidistant therefrom. The shaft G, with the pinion F and gear-wheel H thereon, is entered between the gears E on the several barrels for the pinion F to mesh with each gear E, as shown in Fig. 1. The shafts M and M' are entered at their lower ends in holes therefor in the end bars of the frame R, each shaft having thereon its driving-pinion, worm-gear, and drum s. The shaft J, with the gear K and pinion I mounted thereon, has its lower end inserted in the hole therefor in the central bar of the lower frame-work R' for the pinion I to mesh with the main driving-gear H and for the gear K to mesh with the pinion L of the worm-wheel N. The shaft J', with the pinion I' and gear K' thereon, has its lower end inserted in the hole therefor in the central bar of the lower frame-work R' for the pinion I' to mesh with the main driving-gear H and the gear K' to mesh with the pinion L' of the worm-gear N', and the upper plate or frame-work R is placed in position to receive and support the several shafts and hold the mechanism, as a whole, in proper connection. The L-levers d are pivoted to the frame-work to have the slot e in the end of the long arm of lever engage the pin f on the hub g of the respective gears K and K', and the rods h are connected with the short arm of each lever to have the rod h for the lever d, which moves the gear K, run to the opposite end of the car from the gear, and the rod h for the bell-crank lever d of the gear K' run to the opposite end of the car from the gear K', as shown in Fig. 2. The gears O and O' for the axles are mounted each on its axle, so as to slide thereon longitudinally and be held thereto by a spline or otherwise, and the axles, with the wheels Q, are set to have the gear O engage with the worm-gear N and the gear O' engage with the worm-gear N', which completes the connection of the power mechanism with the running-gear for the car. The levers T are each pivoted to the arm T' therefor by the pin or pivot m to have the fork l straddle the hub or center i, with the pin j in the slot k of each arm of the fork l, and the outer end of each lever T is connected by the link n with the arm o, attached to the shaft U, which shaft is mounted in suitable bearings on the car-frame and is locked by a suitable dog or clutch u or in any other well-known manner. The wheel p is attached to the lower end of the shaft U and the chain q attached thereto and to the end of the flat spring r, which spring winds around the drum s and is firmly attached at its end to a pin t on the lower frame-work R' or otherwise firmly secured, and when the parts are thus connected and the frame-work for the power mechanism attached to the car-frame the motor, as a whole, is mounted on the car and is ready for use.

The length of the spring r and its relation to the drum s and the wind of the chain q onto the wheel p with the movement of the arm o are coequal, so that the lever T will slide the driving-gear connected therewith out of engagement with the worm-wheel coincident with the application of the brake-band r to act on the drum s and hold the worm-gear, and the release of the brake-band r from its drum s is coincident with the sliding of the axle-gear into engagement with its worm-gear by a reverse movement of the shaft U, the result being that the application of the brake-band r to its drum s is coincident with the movement of the lever T, so that as the brake-band acts and stops and holds the worm-gear the lever acts and carries the axle-gear out of engagement, and as the brake-band releases the gear is carried into engagement, by which arrangement it will be seen that the worm-gear is held by the brake-band when released from the axle-gear and is held by the axle-gear when released by the brake-band, and this arrangement prevents the worm-gear from being at any time released, so as to be revolved from the power of the springs, except when engaged with the axle-gear. The rod h, running to the opposite end of the car from that on which the gear moved by the rod is located, prevents any displacement of the gear, as when the operator leaves the platform he, through the rod h, throws into use the gear which has been out of use, and cannot throw the other gear out of use until he reaches the opposite platform, by which arrangement the connecting-gear between the main drive-wheel and the worm-gear which is brought into use must be the one which will operate the worm-gear to propel the car in the direction required.

In use, as shown in Figs. 1 and 2, the car is propelled in the direction of the arrow in Fig. 1, and with the car traveling in this direction the driving-axle gear O is engaged with the worm-gear N, and the pinion L is engaged with the gear K, and the pinion I is engaged with the main drive-wheel H, while the pinion I′ and gear K′ are disengaged from the main drive-wheel and the pinion L′. The barrels A all revolve toward the center wheel F and in the direction of the arrows shown in Fig. 1, and such rotation of the barrels is had by reason of the release of all the springs to the center, which rotates the barrels A on their journals b, and such rotation of the barrels carries with them the gears E, connected one to each barrel, and these gears transmit their united power onto the center wheel or pinion G, with which they mesh, revolving such wheel in the direction of the arrow shown in Fig. 1, turning the shaft G correspondingly and driving the main wheel H in the same direction, as shown by the arrows in Fig. 1, and this rotation of the main wheel H, when such wheel is in mesh with the pinion I, turns such pinion in the direction of the arrow in Fig. 1, rotating the shaft J in the same direction and driving the wheel K correspondingly, as shown by the arrow in Fig. 1, and such rotation of the wheel K drives the pinion L in the direction of the arrow in Fig. 1, rotating the shaft M in the same direction and turning the worm-wheel N likewise, as shown by the arrow in Fig. 1, which rotation of the wheel N by its engagement with the axle-gear O turns such gear in a forward direction, as indicated by the arrow in Fig. 1, revolving the axle P and wheels Q of such wheel O forward and propelling the car.

The car will travel in the direction indicated by the arrow in Fig. 1 as long as the gear K is engaged with the pinion L and the pinion I is engaged with the main drive-wheel H, and to reverse the travel of the car the operator leaves a front platform engaging the gear K′ and pinion I′ before leaving and goes to the rear platform, which then becomes the front platform, and throws the gear K and pinion I out of mesh with the pinion L and main drive-wheel H, and also throws the axle-gear O′ into mesh with the worm-gear N′, releasing at the same time the brake-band r from the pulley or drum s, and having released the axle-gear O from the worm-gear N on leaving the first platform, and at the same time applied the brake-band r to the pulley or drum s of the worm-gear N, the worm-gear N′ becomes the driving-gear for the car, and with this connection the barrels A, gears E, pinion G, and main drive-wheel H revolve in the same direction, as indicated by the arrows in Fig. 1, and the driving-wheel H transmits power to the pinion I′, revolving such pinion in the direction of the arrows in Fig. 1, and through the shaft J′ revolving the gear K′ in the direction indicated by the arrow in Fig. 1, which gear, meshing with the pinion L′, drives such pinion in the direction of the arrow in Fig. 1, and through the shaft M′ rotates the gear N′ in the same direction, as indicated by the arrow in Fig. 1, and as the thread of this worm-gear has the opposite pitch to that of the thread on the worm-gear N such worm-gear acts on the axle-gear O′ and revolves such gear in the direction of the arrow in Fig. 1, which is the opposite direction to that of the axle-gear O, and such revolving of the axle-gear O′ revolves the axle P and wheels Q of the gear O′ in the same direction as the gear O′, thereby propelling the car in the opposite direction corresponding to the travel of the gear O′ and its axles and wheels.

The springs are graded each to a certain power, so that their united force, transmitted onto the center or main driving-wheel H through the pinion F, will unite the power of all the springs onto the main drive-wheel for transmission through the connecting-gears to the axle for propelling the car, and the united power of all the springs is one to produce the required speed for the distance desired for the car to travel, as in propelling the car under a certain speed and for a given distance only so much power is required, and this power will be taken from all the springs, releasing the spring as a whole to the limited extent required for the speed and distance in a certain time, instead of releasing the entire power of a single spring, and thereby a longer distance of travel is assured with the united power of a number of springs transmitted to a single drive-wheel than with the power of a single spring transmitted to the same wheel. The springs are wound at the terminal of the line or at such other point as may be desired, and to wind the springs a key or shaft is inserted in the hole $v'$ of the hub V and power applied to turn the key or shaft, which turns the hub and revolves the gear and winding wheel V, and such wheel, by meshing with the pinions W of the several shafts D, revolves such winding-pinions simultaneously and turns all of the shafts at one and the same time simultaneously winding up all of the power-springs C for the several barrels A, and when the springs are completely wound all the springs are held by the single dog $x$, engaging with the ratchet $w$, which locks the hub $v$ and thereby locks the gear or winding wheel V, and with such wheel stationary the pinions W are all locked and the shafts are held stationary, holding the several barrels B stationary, so that with a release of the power mechanism to propel the car each spring C must release to the center, propelling the several barrels in the same direction to apply the power of the several springs to the main drive-wheel. The winding of the power-spring up does not affect the power mechanism, as the wheel V is free to turn without turning the shaft G, and with the wheel V locked by the dog $x$ and ratchet $w$ the shaft G is free to turn without affecting the winding mechanism, the result being a winding up of the springs without effect on the power-transmitting mechanism and the operation of the power-transmitting mechanism without effect on the winding devices.

The connecting-gear between the two worm-gears and the main power-wheel H is operated from opposite ends of the car, and with the car traveling in the direction of the arrow in Fig. 1 the connecting-gear for the worm-wheel N' is out of engagement and the connecting-gear for the worm-wheel N is in engagement, and the operator, standing on the platform X, can only move the connecting-gear for the worm-gear N', as the connecting-gear between the main drive-wheel and the worm-gear N can only be operated from the platform X'. The operator, standing on the platform X, disengages the connecting-gear for the worm-wheel N' through the rod $h$ and the bell-crank lever $d$, and in leaving the platform X when the car is at the end of its running the operator throws the connecting-gear for the worm-wheel N' into mesh, so that at this time the connecting-gear for the worm-wheel N and the connecting-gear for the worm-wheel N' will both be in mesh with the wheel and with the connecting-gears, and with both in mesh the power mechanism will be locked and will so remain until one of the gears is disconnected. The connecting-gear for the worm-wheel N' is out of mesh when the car is traveling in the direction of the arrow in Fig. 1 and the operator is on the platform X, and with the operator on the platform X the axle-gear O can be thrown into and out of mesh with the worm-gear N for driving or propelling the car, and when the operator leaves the platform X to mount the platform X' and run the car in the opposite direction to that in Fig. 1 he throws the axle-wheel O out of mesh with the worm-wheel N, and at the same time the brake-band or spring $r$ is applied to the hub or drum of the worm-wheel N, so as to firmly hold and lock such wheel against rotation, and the driver in mounting the platform X' throws the axle-wheel O', which is out of mesh with its worm-wheel N', with the car traveling in the direction of the arrow in Fig. 1, into mesh with its worm-wheel N', connecting the axle of the wheel O' with the worm-wheel, and as the wheel N' has been connected with the main drive-wheel H before the operator leaves the platform X the power is connected so as to be transmitted to the axle of the wheel O', and when the driver has engaged the wheel O' with its worm-gear N' he throws the connecting-gear for the worm-wheel N out of mesh, which leaves the power to be transmitted from the main drive-wheel H through the connecting-gear to the worm-wheel N', and thence through the gear O' to the axle of such gear and propel the car in the opposite direction to that in Fig. 1. It will thus be seen that the power is locked and held when the car is at a standstill, and is released with the car moving in either direction, and when released the recoil of the springs is controlled by the power required to propel the car.

The stopping of the car requires the application of the power to cease on the axle-gear, and this is had with each stoppage by throwing the axle-gear out of mesh with its worm-gear, which at the same time applies the brake-band to the hub or drum of the worm-gear and locks and holds the worm-gear, and it will thus be seen that the power is under control at all times by the operator.

What I claim as new, and desire to secure by Letters Patent, is—

1. The combination, in a motor, of a series of power-springs, a center pinion receiving the power of all the springs, a main wheel driven from the power applied to the center pinion, an axle-gear, and a connecting and power-transmitting mechanism between the main wheel and the axle-gear, substantially as and for the purposes specified.

2. The combination, in a motor, of a series of power-springs, a center pinion receiving power from all the springs, a main wheel driven by the power on the center pinion, a power-transmitting gear on opposite sides of the main drive-wheel, a connecting-gear between the main wheel and each power-transmitting gear, and an axle-gear for each power-transmitting gear, substantially as and for the purposes specified.

3. The combination, in a motor, of a series of power-springs, a center pinion receiving power from all of the springs, a main wheel driven from the power applied to the center pinion, power-transmitting gears on opposite sides of the main drive-wheel, a movable gear connecting and disconnecting the main drive-wheel and each power-transmitting gear, and an axle-gear for each power-transmitting gear, substantially as and for the purposes specified.

4. The combination, in a motor, of a series of power-springs, a center pinion receiving power from all of the springs, a main wheel driven from the center pinion by the power applied thereto, power-transmitting gears on opposite sides of the main drive-wheel, a movable gear connecting and disconnecting each power-transmitting gear with the main drive-wheel, and a movable axle-gear connecting and disconnecting the power-transmitting gear with the axle of the car, substantially as and for the purposes specified.

5. The combination, in a motor, of a series of barrels, an arbor for each barrel, a power-spring for each barrel, connected with the barrel and with the arbor, a gear for each barrel, a center pinion meshing with the barrel-gears and receiving power from all of the springs, a main wheel driven from the power applied to the center pinion, and a connecting and power-transmitting mechanism between the main drive-wheel and car-axle, substantially as and for the purposes specified.

6. The combination, in a motor, of a series of barrels, an arbor for each barrel, a power-spring for each barrel, connected with the barrel and with the arbor, a gear on each barrel, a center pinion meshing with the barrel-gears and receiving power from all the springs, a main wheel driven by the power applied to the center pinion, a power-transmitting gear, and a connecting-gear between the main drive-wheel and the power-transmitting gear, substantially as and for the purposes specified.

7. The combination, in a motor, of a series of barrels, an arbor for each barrel, a power-spring in each barrel, connected with the barrel and with the arbor, a center pinion receiving the power, a gear for each barrel, a center pinion meshing with the barrel-gears and receiving the power of all the springs, a main wheel driven by the power applied to the center pinion, a power-transmitting gear on opposite sides of the main drive-wheel, a connecting-gear between the main drive-wheel and each power-transmitting gear, and an axle-gear meshing with the power-transmitting gear, substantially as and for the purposes specified.

8. The combination, in a motor, of a series of barrels, an arbor for each barrel, a spring for each barrel, connected with the barrel and with the barrel-arbor, a gear for each barrel, a center pinion meshing with the barrel-gears and receiving the power of all the springs, a main wheel driven from the power applied to the center pinion, a power-transmitting gear on opposite sides of the main wheel, a movable gear connecting and disconnecting the main wheel with each power-transmitting gear, and a movable gear on each axle connecting and disconnecting the power-transmitting gear with the axle, substantially as and for the purposes specified.

9. The combination, in a motor, of a series of barrels arranged in pairs, an arbor for each barrel, with the arbors of two companion barrels connected to each other, a power-spring for each barrel, connected with the barrel and with the arbor, and a shaft for each pair of barrels, each shaft carrying the companion arbors for winding and releasing the springs of the barrels simultaneously, substantially as specified.

10. The combination, in an arbor, of a series of barrels arranged in pairs, an arbor for each barrel, with the arbors of two companion barrels connected to each other, a power-spring for each barrel, connected with the barrel and with the arbor, a shaft for each pair of barrels, each shaft receiving two companion arbors, a gear for each barrel, arranged on the barrels to lie face to face, a center pinion common to all the barrel-gears and receiving the power from all the springs, and a main wheel driven from the power applied to the center pinion, substantially as and for the purposes specified.

11. The combination, in a motor, of a series of barrels arranged in pairs, an arbor for each barrel, with the companion arbors connected one to the other, a power-spring for each barrel, connected with the barrel and with the arbor, a gear for each barrel, arranged face to face, a center pinion common to all the barrel-gears and receiving the power of all the springs, a main wheel driven from the power applied to the center pinion, and a power connecting and transmitting mechanism between the main drive-wheel and a car-axle, substantially as and for the purposes specified.

12. The combination, in a motor, of a series of barrels arranged in pairs, an arbor for each barrel, with the companion arbors connected one to the other, a power-spring for each barrel, connected with the barrel and with the arbor, a shaft for each pair of barrels receiving the companion arbors, a gear for each barrel arranged to have the gears of companion barrels face to face, a center pinion common to all of the barrel-gears and receiving power from all of the springs, a main wheel driven from the power applied to the center pinion, a power-transmitting gear on opposite sides of the main drive-wheel, a movable gear connecting and disconnecting each power-transmitting gear with the main drive-wheel, and a movable gear connecting and disconnecting each power-transmitting gear with a car-axle, substantially as and for the purposes specified.

13. The combination, in a motor, of a series of barrels arranged in pairs, an arbor for each barrel, with the companion barrels connected one to the other, a spring for each barrel, connected with the barrel and the arbor, a shaft for each pair of barrels receiving the companion arbors, a winding-pinion on each shaft, and a winding-gear common to all the winding-pinions for simultaneously winding all of the power-springs, substantially as specified.

14. The combination, in a motor, of a series of barrels arranged in pairs, an arbor for each barrel, with the companion arbors connected one to the other, a power-spring for each barrel, connected with the barrel and with the arbor, a shaft for each pair of barrels, each shaft carrying the companion arbors, a winding-pinion for each arbor-shaft, a winding-gear common to all of the winding-pinions, a gear on each barrel, arranged to have the companion gears face to face, a center pinion common to all of the barrel-gears and receiving the power of all the springs, a main wheel driven from the power applied to the center pinion, and a shaft carrying the power-pinion and the main wheel and mounted at one end in the hub of the winding-gear, substantially as and for the purposes specified.

15. The combination, in a motor, of a main drive-wheel, a power-transmitting gear on opposite sides of the main drive-wheel, and a movable gear connecting and disconnecting the main drive-wheel with the power-transmitting gear, substantially as and for the purposes specified.

16. The combination, in a motor, of a main drive-wheel, a power-transmitting gear on opposite sides of the main drive-wheel, a movable gear connecting and disconnecting the main drive-wheel and each power-transmitting gear, and a movable gear connecting and disconnecting each power-transmitting gear with a car-axle, substantially as and for the purposes specified.

17. The combination, in a motor, of a main drive-wheel, a power-transmitting gear on opposite sides of the main drive-wheel, a movable gear connecting and disconnecting the main drive-wheel with each power-transmitting gear, a locking means for each power-transmitting gear, and a movable gear connecting and disconnecting the power-transmitting gear with the axle of the car and operating coincident with the locking means for the transmitting-gear, substantially as and for the purposes specified.

18. The combination, in a motor, of a main drive-wheel, a power-transmitting gear on opposite sides of the main drive-wheel, a movable gear between each power-transmitting gear and the main drive-wheel, connecting and disconnecting the main drive-wheel with the power-transmitting gear, and means for moving each connecting-gear and having the actuating one released only from the opposite side of the main drive-wheel to that on which it is located, substantially as and for the purposes specified.

19. The combination, in a motor, of a main drive-wheel, a power-transmitting gear, a connecting-gear between the main drive-wheel and the power-transmitting gear and operated from the opposite platform of the car, a locking means for the power-transmitting gear, and a movable gear on the car-axle operated simultaneously with the movement of the locking means for the power-transmitting gear, substantially as and for the purposes specified.

20. The barrels A, arranged in pairs, arbors B, one for each barrel A, and springs C, one for each barrel A, in combination with the shafts D, one for each pair of barrels A, and each shaft carrying two companion arbors B, substantially as and for the purposes specified.

21. The barrels A, arranged in pairs, arbors B, one for each barrel A, clutches $b''$, each connecting two companion arbors B, and springs C, one for each barrel A, in combination with the shafts D, one for each pair of barrels A, and each shaft carrying two companion arbors B, substantially as and for the purposes specified.

22. The barrels A, arranged in pairs, arbors B, one for each barrel A, springs C, one for each barrel A, and shafts D, one for each pair of barrels A, and each shaft carrying two companion arbors B, in combination with the gears E, one for each barrel A, with the gears of the companion barrels arranged face to face, and center pinion F, meshing with all of the gears E, substantially as and for the purposes specified.

23. The barrels A, arranged in pairs, arbors B, one for each barrel A, springs C, one for each barrel A, and shafts D, one for each pair of barrels A, and each shaft D carrying two companion arbors B, in combination with the gears E, one for each barrel A, with the gears for the companion barrels arranged face to face, center pinion F, meshing with all of the gears E, shaft G for the pinion F, and main wheel H, carried by the shaft G, substantially as and for the purposes specified.

24. The barrels A, arranged in pairs, arbors B, one for each barrel A, springs C, one for each barrel A, and shafts D, one for each pair of barrels A, and each shaft carrying two companion arbors B, in combination with the gears E, one for each barrel A, with the gears for the companion barrels arranged face to face, center pinion F, meshing with all of the gears E, shaft G for the pinion F, drive-wheel H, carried by the shaft G, pinion I, meshing with the main drive-wheel H, shaft J for the pinion I, gear K, carried by the shaft J, pinion L, meshing with the gear K, shaft M for the pinion L, and worm-gear N, carried by the shaft M, for transmitting the power of a series of springs to the worm-wheel N, substantially as and for the purposes specified.

25. The barrels A, arranged in pairs, arbors B, one for each barrel A, springs C, one for each barrel A, shafts D, one for each pair of barrels A, and each shaft carrying two companion arbors B, gears E, one for each barrel A, with the gears for companion barrels arrels arranged face to face, center pinion F, meshing with all of the gears E, shaft G for the pinion F, and main drive-wheel H on the shaft G, in combination with the pinion I, shaft J, gear K, with the pinion I and gear K movable on the shaft J, pinion L for the gear K, shaft M of the pinion L, worm-gear N on the shaft M, movable gear O on the car-axle, and car-axle P, substantially as and for the purposes specified.

26. The barrels A, arranged in pairs, arbors B, one for each barrel A, springs C, one for each barrel A, shafts D, one for each pair of barrels A, and each shaft carrying two companion arbors B, gears E, one on each barrel A, with the gears for the companion barrels face to face, center pinion F, meshing with all of the gears E, shaft G for the center pinion F, and main drive-wheel H on the shaft G, in combination with the pinion I, shaft J, gear K, with the pinion I and gear K movable on the shaft J, pinion I', shaft J', gear K', with the pinion I' and gear K' movable on the shaft J', pinions L and L', shafts M and M', and worm-gear N and N', movable gears O and O', and car-axles P, substantially as and for the purposes specified.

27. The main drive-wheel H, pinions I and I', shafts J and J', and gears K and K', in combination with the pinions L and L', shafts M and M', worm-gears N and N', L-levers d, slots e, one in each long arm of the L-levers d, pins f, and hubs g, and rods h for connecting and disconnecting the main drive-wheel H and the worm-gears N and N', substantially as and for the purposes specified.

28. A worm-gear and an axle-gear movable on the axle and meshing with the worm-gear, in combination with the lever T, shaft U, connected with the lever T, chain q, wound from the shaft U, brake-band r, and hub or drum s on the worm-gear for connecting and disconnecting the worm-gear and an axle-gear and unlocking and locking the worm-gear, substantially as and for the purposes specified.

29. The winding-wheel V, having the hub v, with a key-hole v', in combination with the pinions W, each meshing with the wheel V, and shafts D, carrying the arbors B for winding the power-springs simultaneously, substantially as and for the purposes specified.

WALTER L. DAVIS.

Witnesses:
   O. W. BOND,
   M. L. PRICE.